(12) United States Patent
Yang et al.

(10) Patent No.: US 9,860,480 B2
(45) Date of Patent: Jan. 2, 2018

(54) METHOD FOR PROCESSING INFORMATION AND ELECTRONIC DEVICE

(71) Applicants: Beijing Lenovo Software Ltd., Beijing (CN); Lenovo (Beijing) Co., Ltd., Beijing (CN)

(72) Inventors: Lizhong Yang, Beijing (CN); Nanjun Li, Beijing (CN); Ying Huang, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 123 days.

(21) Appl. No.: 14/499,579

(22) Filed: Sep. 29, 2014

(65) Prior Publication Data
US 2015/0179110 A1 Jun. 25, 2015

(30) Foreign Application Priority Data

Dec. 23, 2013 (CN) .......................... 2013 1 0716802
Feb. 25, 2014 (CN) .......................... 2014 1 0064818

(51) Int. Cl.
*G06F 3/14* (2006.01)
*H04N 5/74* (2006.01)
(Continued)

(52) U.S. Cl.
CPC ................. *H04N 5/74* (2013.01); *G06F 3/14* (2013.01); *H04N 9/3185* (2013.01); *H04N 21/4126* (2013.01)

(58) Field of Classification Search
CPC .... H04N 5/74; H04N 21/4126; H04N 9/3185; G06F 3/14
See application file for complete search history.

(56) References Cited

U.S. PATENT DOCUMENTS 8,276,085 B2 * 9/2012 Sherwani ................ H04L 67/38
715/718
9,030,379 B2 5/2015 Xu et al.
(Continued)

FOREIGN PATENT DOCUMENTS

CN 101546221 A 9/2009
CN 102096442 A 6/2011
(Continued)

OTHER PUBLICATIONS

First Chinese Office Action regarding Application No. 201410064818.X dated Jul. 4, 2016. English translation provided by Unitalen Attorneys at Law.
(Continued)

*Primary Examiner* — Premal Patel
(74) *Attorney, Agent, or Firm* — Harness, Dickey & Pierce, P.L.C.

(57) ABSTRACT

A method for processing information and an electronic device are provided. The method is applicable in a first electronic device, including: receiving an operational instruction; transmitting the received operational instruction to a second electronic device which is wirelessly coupled to the first electronic device; receiving information corresponding to the operational instruction, wherein the information is processed by the second electronic device; and generating, by the first electronic device in response to the information, light to display in a predetermined region.

16 Claims, 9 Drawing Sheets

(51) Int. Cl.
*H04N 9/31* (2006.01)
*H04N 21/41* (2011.01)

(56) References Cited

U.S. PATENT DOCUMENTS

| | | | |
|---|---|---|---|
| 2012/0169765 A1 | 7/2012 | Xu et al. | |
| 2013/0040623 A1* | 2/2013 | Chun | H04N 21/4126 455/414.2 |
| 2013/0063337 A1* | 3/2013 | Wright | G06F 3/0304 345/156 |
| 2013/0100009 A1* | 4/2013 | Willis | H04N 9/3147 345/156 |
| 2013/0282306 A1* | 10/2013 | Kao | H04W 76/023 702/33 |
| 2013/0307772 A1* | 11/2013 | Wu | G06F 3/0304 345/158 |
| 2013/0307796 A1* | 11/2013 | Liu | G06F 3/041 345/173 |
| 2014/0035893 A1 | 2/2014 | Jackson et al. | |
| 2014/0043516 A1 | 2/2014 | Baker | |
| 2015/0058782 A1* | 2/2015 | Kutliroff | G06F 3/04815 715/773 |
| 2015/0192960 A1* | 7/2015 | Sharma | G06F 3/1462 345/2.2 |

FOREIGN PATENT DOCUMENTS

| | | |
|---|---|---|
| CN | 103179362 A | 6/2013 |
| CN | 103309133 A | 9/2013 |
| CN | 103338342 A | 10/2013 |
| CN | 104090684 A | 10/2014 |
| EP | 2665277 A1 | 11/2013 |

OTHER PUBLICATIONS

First Chinese Office Action regarding Application No. 201310716802.8 dated Jun. 27, 2017. English translation provided by http://www.globaldossier.uspto.gov.

* cited by examiner

METHOD FOR PROCESSING INFORMATION AND ELECTRONIC DEVICE

The present application claims the priority to Chinese Patent Application No. 201310716802.8, entitled as "METHOD FOR PROCESSING INFORMATION AND ELECTRONIC DEVICE", filed on Dec. 23, 2013 with State Intellectual Property Office of People's Republic of China, which is incorporated herein by reference in its entirety.

The present application claims the priority to Chinese Patent Application No. 201410064818.X, entitled as "PROJECTION METHOD AND ELECTRONIC DEVICE", filed on Feb. 25, 2014 with State Intellectual Property Office of People's Republic of China, which is incorporated herein by reference in its entirety.

FIELD

The disclosure relates to the field of computer technology, and in particular to a method for processing information and an electronic device.

BACKGROUND

Since the mobility of the desktop computer is poor and its use scenario is limited, more and more users prefer to use portable terminals instead of desktop computers. However, the fact is that the vacancy rate of the desktop computer is becoming high and resources are wasted. A solution for overcoming the poor mobility of the desktop computer is that a host of the desktop computer is separated from the interaction device (for example, a keyboard, a mouse, a display screen) and the host is wirelessly coupled to the interaction device.

In the above solution for overcoming the poor mobility of the desktop computer, the output of the host relies on the display screen. However, during the output process by utilizing the display screen, the user needs to hold the display screen in hand or disposes the display screen at a fixed position or with a fixed angle. In this case, user is more likely to feel fatigue when watching the display screen, and user experience is not good.

Furthermore, if the user wants to project the desired picture or the desired video information, it is required to predetermine a projection plane onto which the picture or the video information is to be projected and manually adjust the distance between the predetermined projection plane and the projection device for adjusting the size of a projection picture to make the position of the projection picture a projection position as desired by the user.

In the above process for achieving the projection, the user needs to manually adjust the distance between the predetermined projection plane and the projection device for adjusting the projection position, which is inconvenient for the user and degrades the user experience.

SUMMARY

It is provided a method for processing information and an electronic device according to the embodiments of the disclosure.

In a first aspect, it is provided a method for processing information, including: receiving an operational instruction associated with a first electronic device; transmitting the received operational instruction to a second electronic device which is wirelessly coupled to the first electronic device; receiving an information from the second electronic device, wherein the information is corresponding to the operational instruction; and generating, by the first electronic device, light to display in a predetermined region responsive to the information.

In a second aspect, An electronic device, including: an obtaining module, which receives an operational instruction; a wireless transmitting module, which transmits the operational instruction to a second electronic device wirelessly coupled to the electronic device; wherein the obtaining module further receives an information from the second electronic device, and the information is corresponding to the operational instruction; a processing module, which generates light to display in a predetermined region responsive to the information received by the obtaining module.

DETAILED DESCRIPTION OF THE EMBODIMENTS

The technical solutions in the embodiments of the disclosure will be described clearly and completely in conjunction with the drawings in the embodiments of the disclosure hereinafter. Apparently, the described embodiments are only some embodiments of the disclosure, not all the embodiments. All of other embodiments obtained by those skilled in the art without any creative work fall within the scope of protection of the disclosure.

In a first embodiment, a second embodiment and a third embodiment of the disclosure, a system consists of a first electronic device and a second electronic device. In the system, the first electronic device transmits an operational instruction to the second electronic device; the second electronic device receives and processes the operational instruction and transmits a result obtained by processing the operational instruction to the first electronic device; and the first electronic device responds to the result, therefore the information is interacted and processed.

In the embodiment, the system consists of the first electronic device and the second electronic device. The system may be a computer system. The first electronic device may be an input/output device of the computer system, and the second electronic device may be a host of the computer system. In the embodiments of the disclosure, the first electronic device is wirelessly coupled to the second electronic device, hence the first electronic device is relatively independent from the second electronic device. For clearness, in the following illustration the first electronic device is referred to as a smart device, and the second electronic is referred to as a host.

Figure 1:
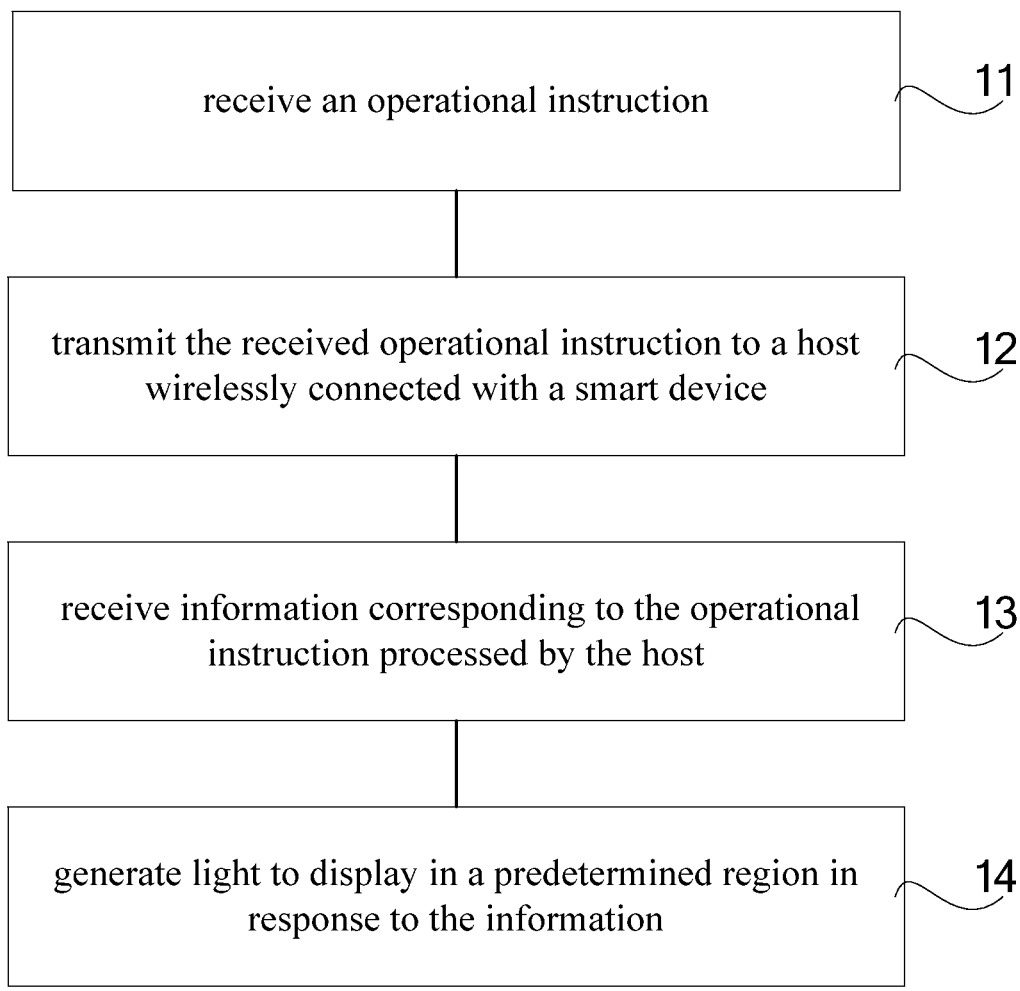
FIG. 1 is a flow chart of a method for processing information according to a first embodiment of the disclosure.

A method for processing information is provided according to a first embodiment of the disclosure, which may be implemented by the smart device (i.e., the first electronic device). As shown in FIG. 1, the method includes step 11 to step 14.

In step 11, an operational instruction is received.

In this step, after the smart device is started, the smart device may receive an operational instruction transmitted from a user or transmitted by a user via other devices. The operational instruction may be a voice instruction, a somatosensory instruction (including an action, a gesture, an expression and the like instructions) and so on. Practically, the operational instruction may also be an instruction transmitted when the user operates a mouse, a keyboard or a touch screen, where the mouse, the keyboard or the touch screen may be arranged on the smart device. A content of the operational instruction may be that the smart device is commanded by the user to play a film, to move to a certain position or to execute a security monitoring task etc., for example.

The smart device may also receive a virtual keyboard instruction. The way of receiving may be that: the smart device projects light onto a plane to form a virtual keyboard, and the user may "tap" the virtual keyboard, for example. The action of "tapping" the virtual keyboard reflects light, and the reflected light may be received by the smart device. The smart device may recognize the "tapping" action of the user by analyzing the reflected light, thereby obtaining the virtual keyboard instruction.

It should be noted that, the way of receiving the virtual keyboard instruction by the smart device described above is only an example, and the disclosure is not limited thereto. The specific implementing process of this step is the same as that in the conventional art, which is not described here.

In step 12, the received operational instruction is transmitted to a host which is wirelessly coupled to the smart device.

In the embodiment of the disclosure, a wireless communication module is provided in the smart device, hence the smart device communicates with the host wirelessly via the wireless communication module. Here, the host is the second electronic device. The host which communicates with the smart device wirelessly may be located at hone or in an office, or may also be managed at a data center. The host may be one host or multiple hosts.

In this step, the wireless communication way between the smart device and the host may be selected based on the communication distance, the position of the host etc, and the implementing way for the wireless communication is the same as that in the conventional art. For example, in the case that the host is located at the user's home or in the office, the smart device may communicate with the host wirelessly via a wireless router.

In step 13, information processed by the host corresponding to the operational instruction is received.

In this step, the wireless communication module in the smart device may receive the information corresponding to the operational instruction transmitted from the host. The information corresponding to the operational instruction is obtained by processing the operational instruction by the host. After the information corresponding to the operational instruction is obtained, the host transmits the information corresponding to the operational instruction to the smart device wirelessly, for example via the wireless router.

The information corresponding to the operational instruction is a response made by the host to the operational instruction, which may be called as response information to the operational instruction. The response information to the operational instruction includes data information, a motion control instruction, a task execution instruction and so on. The data information includes a sound, a word, an image, an animation etc. stored in the host or obtained from the network by the host. The motion control instruction indicates to an instruction for controlling the smart device to move to a specified position. The task execution instruction indicates to an instruction for controlling the smart device to execute a task except the motion control instruction.

For example, in the case that the user commands the smart device to play a film, the response information to the operational instruction may be data information of the film. In the case that the user commands the smart device to move to a certain position, the response information to the operational instruction may be a motion control instruction for controlling the smart device to move to the position. In the case that the user commands the smart device to execute a security monitoring task, the response information to the operational instruction may be a task execution instruction and the smart device may complete the security monitoring task by executing the task execution instruction.

Step 12 and step 13 show that, the smart device may perform a bidirectional communication with the host wirelessly, hence the position of the smart device is not "constrained" by a host which is more cumbersome relative to the smart device, and the mobility and the portability of the host are improved. It should be noted that, the smart device being not "constrained" by the host means that as long as the smart device is located in a range capable of communicating with the host wirelessly, the smart device may be located at any position. In this case, as long as the user carries the smart device, the user may not only enjoy the portability of the smart device, but also utilize the advantages of the host, such as a strong computing ability, a strong storage ability and a strong communication ability. Hence, the usage of the host of the desktop computer may be improved, it is prevented from wasting resource, and it is conducive to the remaining of the desktop computer in the market.

In step 14, the smart device generates light to display in a predetermined region in response to the information.

In this step, the predetermined region includes a region specified by the operational instruction received by the smart device and a region determined in advance. The smart device may generate light to display in the region specified by the operational instruction or the region determined in advance.

For example, in a case that a region is specified in the operational instruction where the smart device generates light to display, for example, in the operational instruction, the smart device is specified to project on a certain wall, the smart device may generate light to display on the wall specified by the operational instruction. In a case that a region to be projected in is not specified in the operational instruction, the smart device may generate light to project in a region preserved by the host or the smart device in advance, for example in a position which is often watched by the user (for example, the wall of the living room or the bedroom).

Furthermore, in the case that the predetermined region is specified in the operational instruction, in order to help the host to determine the predetermined region, the smart device may obtain an image of an environment around the smart device (for example, photographing an image of an environment around the smart device), and transmits the obtained image to the host. In this way, even if the operational instruction transmitted from the user includes information of a position, for example "here" or "front", which is not specified definitely, the host may also position the user and determine the predetermined region based on the image obtained by the smart device. In the case that the predetermined region is not specified in the operational instruction, the host may also obtain a motion control instruction for controlling the smart device to move to a specified position, based on the positioning of the smart device and a map for the use range of the smart device preserved in the host.

Hereinafter, it is illustrated how the smart device responds to the response information to the operational instruction. After the response information to the operational instruction is received by the smart device, the response information to the operational instruction may be processed in the following multiple ways.

In a first way, the response information to the operational instruction includes data information, and the smart device directly displays the data information for the user by projection. The smart device may only display a visual media or only play an audio, or may display the visual media and play the audio at the same time.

In a second way, the response information to the operational instruction includes a motion control instruction, and the smart device is controlled to move to a position specified by the motion control instruction and performs displaying via projection. The information displayed by projection may be preserved in the smart device.

In a third way, the response information to the operational instruction includes data information and a motion control instruction. The smart device moves to a position specified by the motion control instruction, and displays the data information by projection.

In a fourth way, the response information to the operational instruction includes a task execution instruction, and the smart device executes the task execution instruction to complete a task corresponding to the operational instruction.

In a fifth way, the response information to the operational instruction includes data information and a task execution instruction. The smart device may display the data information and may also execute the task execution instruction.

In a sixth way, the response information to the operational instruction includes a motion control instruction and a task execution instruction. The smart device may move to a position specified by the motion control instruction, and may also execute the task execution instruction to complete a task corresponding to the operational instruction.

In a seventh way, the response information to the operational instruction includes data information, a motion control instruction and a task execution instruction. The smart device may move to a position specified by the motion control instruction, may display the data information by projection, and may also execute the task execution instruction to complete a task corresponding to the operational instruction.

It may be seen from above that, compared with the conventional art in which the user holds a display screen in hand or disposes a display screen at a fixed position or with a fixed angle, resulting in that the user easily feels fatigue when the user watches the display screen, according to method for processing information provided by the disclosure, the smart device performs displaying via projection with an optional angle and size, and the smart device communicates with the host wirelessly and the position of the smart device is not "constrained" by the host, hence the smart device may perform displaying via projection at any position in a flexible way, thereby improving comfort during watching by using the smart device for the user and improving a user experience.

In a variation of the first embodiment of the disclosure, after the operational instruction is received, the smart device may directly move to a position corresponding to the operational instruction, without obtaining a motion control instruction for controlling the smart device to move based on the operational instruction by the host. For example, the smart device preprocesses the operational instruction to obtain a moving instruction. Subsequently, the smart device moves to a predetermined region corresponding to the moving instruction, and generates light to display the data information received from the host in the predetermined region.

Furthermore, in the variation of the first embodiment, the smart device may also determine the predetermined region based on an image of an environment around the smart device or use a predetermined region preserved in advance.

Figure 2:
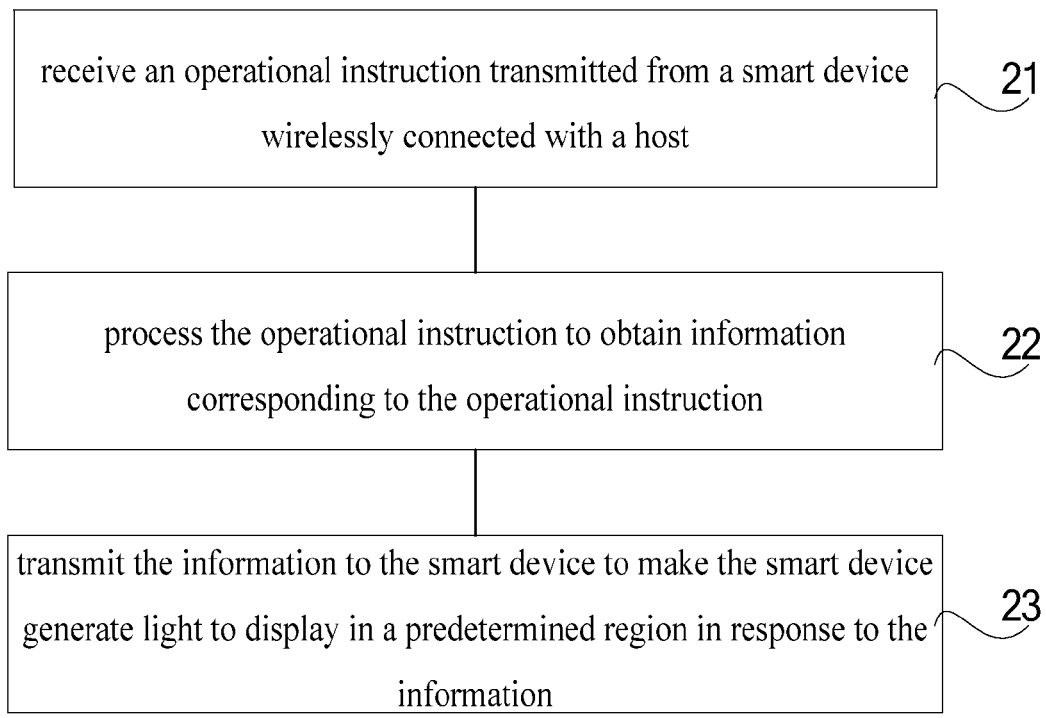
FIG. 2 is a flow chart of a method for processing information according to a second embodiment of the disclosure.

It is provided a method for processing information according to a second embodiment of the disclosure, which may be implemented by a host. As shown in FIG. 2, the method includes step 21 to step 23.

In step 21, an operational instruction transmitted from a smart device which is wirelessly coupled to the host is received.

In step 22, the operational instruction is processed to obtain information corresponding to the operational instruction.

The information corresponding to the operational instruction includes but not limits to any combination of the following information: data information, a motion control instruction and a task execution instruction. This step may be referred to the specific description of step 13 of the first embodiment, which is not described here.

In step 23, the information is transmitted to the smart device to make the smart device generate light to display in a predetermined region in response to the information.

The host may obtain the information corresponding to the operational instruction and transmit the information corresponding to the operational instruction to the smart device to make the smart device perform displaying via projection, move to a specified position or complete a task etc.

It may be seen from above that, compared with the conventional art in which the user holds a display screen in hand or disposes a display screen at a fixed position or with a fixed angle, resulting in that the user easily feels fatigue when the user watches the display screen, according to the method for processing information provided by the disclosure, the smart device performs displaying via projection with an optional angle and size, and the smart device communicates with the host wirelessly and the position of the smart device is not "constrained" by the host, hence the smart device may perform displaying via projection at any position in a flexible way, thereby improving comfort of using the desktop computer for the user and improving a user experience.

Figure 3A:
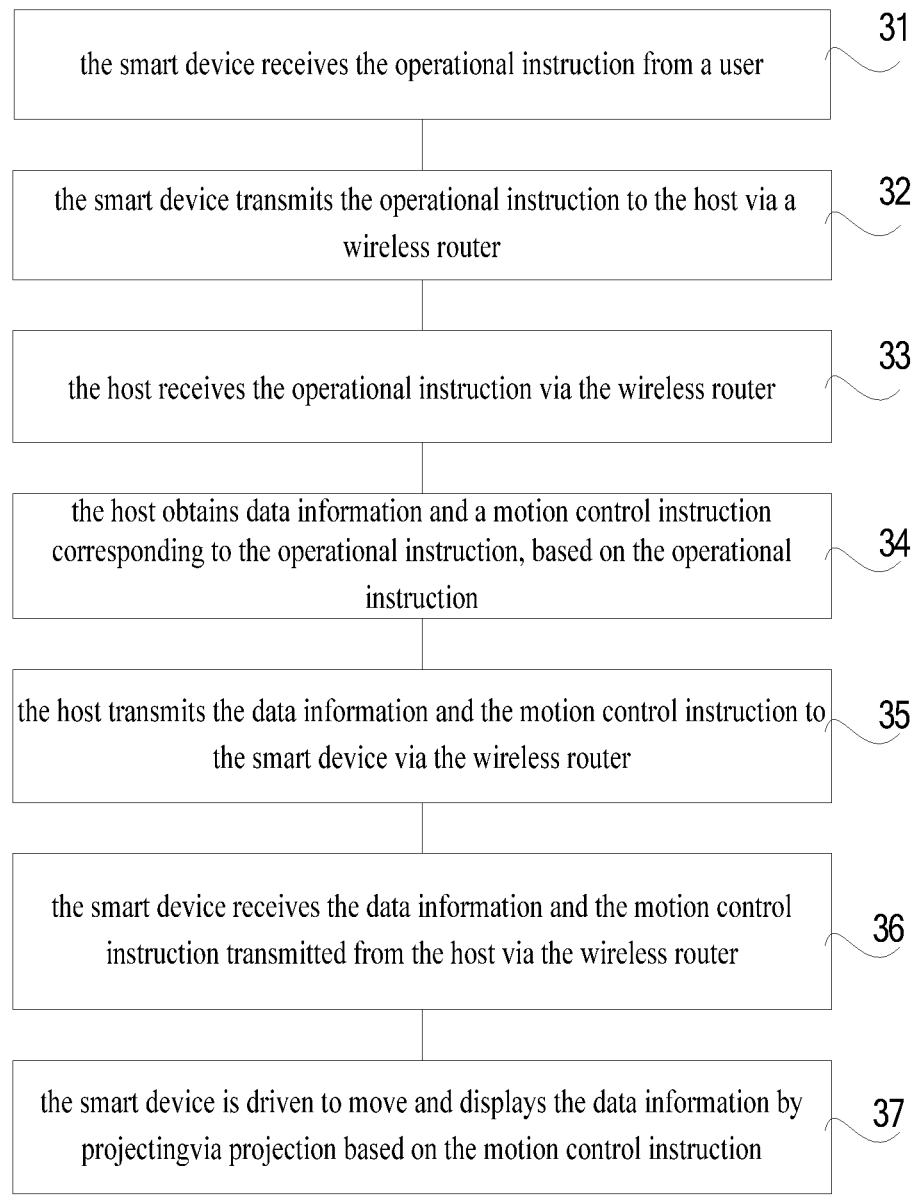
FIG. 3A is a flow chart of a method for processing information according to a third embodiment of the disclosure.
Figure 3B:
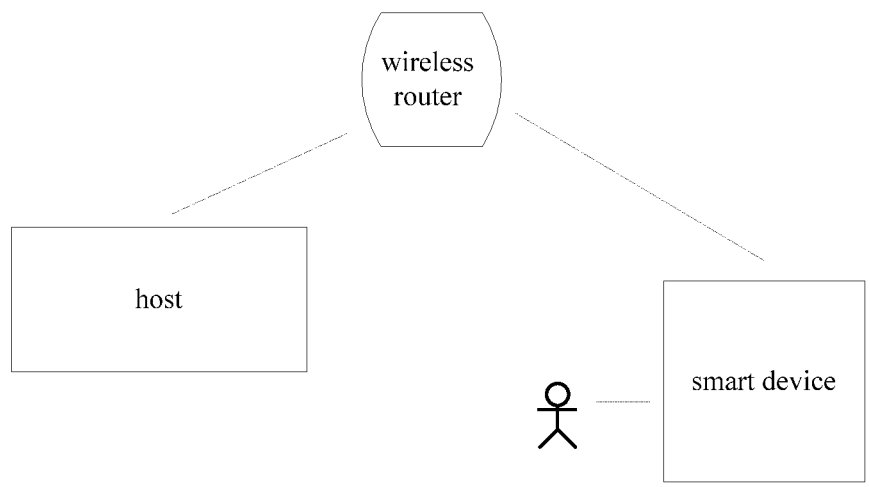
FIG. 3B is a schematic diagram of a method for processing information according to the third embodiment of the disclosure.

As shown in FIG. 3A and FIG. 3B, a third embodiment of the disclosure shows a embodiment of a method for processing information, and the method includes step 31 to step step 36.

In step 31, an operational instruction from a user is received by a smart device.

In this step, the operational instruction may be a voice, a gesture, a virtual keyboard and so on. For example, an operational instruction for commanding the smart device to play a first film on a wall, which is spoken by the user.

In step 32, the smart device transmits the operational instruction to a host via a wireless router.

In this step, the wireless router establishes a wireless link with a wireless communication module in the smart device.

In step 33, the host receives the operational instruction via the wireless router.

In step 34, the host obtains data information and a motion control instruction corresponding to the operational instruction based on the operational instruction.

In this step, the host firstly identifies the meaning of the operational instruction. After the meaning of the operational instruction is identified, the host may search for a file (i.e., the data information) of the first film in a local storage; and the host may download the first film from the network if the file is not found.

In order to identify a position of a wall, before the host obtains the motion control instruction for controlling the smart device to move close to the wall the smart device photographs an image of an environment around the smart device and transmits the image to the host. In this step, the host may identify the position of the wall based on the image and obtain a motion control instruction including the position of the wall.

In step 35, the host transmits the data information and the motion control instruction to the smart device via the wireless router.

The host transmits the file of the first film and the motion control instruction to the smart device via the wireless router.

In step 36, the smart device receives the data information and the motion control instruction transmitted from the host via the wireless router.

In step 37, the smart device moves based on the motion control instruction, and displays the data information via projection.

In this step, the smart device moves close to the wall based on the motion control instruction, and projects light onto the wall automatically. The content displayed via projection is the first film. In addition, the user may transmit other operational instructions, for example an operational instruction for controlling the smart device to adjust the size, the position etc. of a projected picture.

It may be seen from above that, the smart device is actually a movable input/output device separated from the host, which communicates with the host by the wireless communication technology and displays by the automatic projection technology The input to the smart device is adopted in a new interaction way (for example a voice, a gesture, a virtual keyboard and so on). The smart device may move to a specified position based on the operational instruction from the user, and project automatically in a region identified by the host.

It may be seen that, according to the method for processing information described above, the automatic projection technology is adopted, therefore the use range and the application scenarios of the desktop computer and the smart device are extended effectively; in addition, by adopting the new information processing technology the user experience can be effectively optimized. Relative to the smart device, the host actually functions as a home server and a storage device. In addition, compared with a robot which can work independently without a server, the smart device provided by the disclosure is less expensive and can sufficiently utilize the host as the server.

Figure 4:
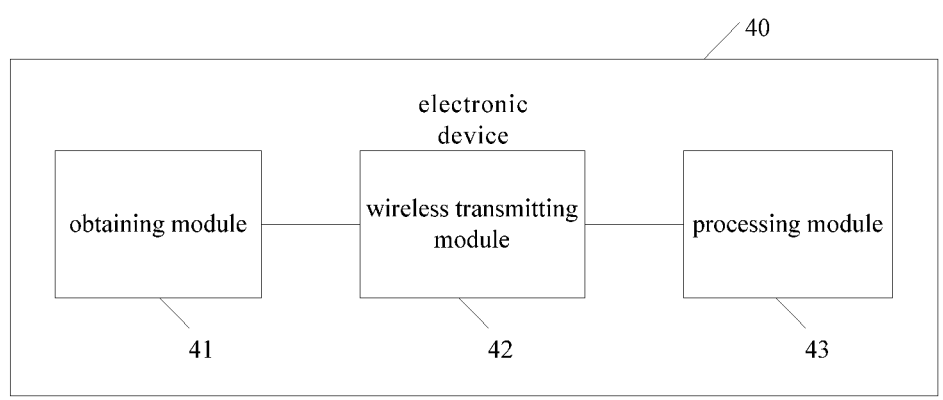
FIG. 4 is a schematic structural diagram of an electronic device according to a fourth embodiment of the disclosure.

As shown in FIG. 4, an electronic device 40 according to a fourth embodiment of the disclosure includes: an obtaining module 41, a wireless transmitting module 42 and a processing module 43.

The obtaining module 41 is configured to receive an operational instruction.

The wireless transmitting module 42 is configured to transmit the operational instruction received by the obtaining module 41 to a second electronic device which is wirelessly coupled to the electronic device 40.

The obtaining module 41 is also configured to receive information corresponding to the operational instruction, where the information is processed by the second electronic device.

The processing module 43 is configured to generate light to display in a predetermined region in response to the information received by the obtaining module 41.

It may be seen from above that, compared with the conventional art in which the user holds a display screen in hand or disposes a display screen at a fixed position or with a fixed angle, resulting in that the user easily feels fatigue when the user watches the display screen, according to the electronic device provided by the disclosure, the electronic device performs displaying via projection with an optional angle and size, and the electronic device communicates with the host wirelessly and the position of the electronic device is not "constrained" by the host, hence the electronic device may perform displaying via projection at any position in a flexible way, thereby improving comfort during watching by using the electronic device for the user and improving a user experience.

In a variation of the fourth embodiment of the disclosure, the information corresponding to the operational instruction includes data information. The processing module 43 may further be configured to generate light to display the data information received by the obtaining module 41 in the predetermined region.

In another variation of the fourth embodiment of the disclosure, the information corresponding to the operational instruction includes a motion control instruction. The processing module 43 may further be configured to execute the motion control instruction received by the obtaining module 41 to make the electronic device 40 move to the predetermined region and performs displaying via projection.

Optionally, the obtaining module 41 is also configured to obtain an image of an environment around the electronic device 40. The wireless transmitting module 42 is also configured to transmit the image obtained by the obtaining module 41 to the second electronic device to make the second electronic device determine a specified position based on the image.

In another variation of the fourth embodiment of the disclosure, the processing module 43 is also configured to preprocess the operational instruction received by the obtaining module 41 to obtain a moving instruction; and move electronic device to the predetermined region corresponding to the moving instruction and generate light to display the data information in the predetermined region.

It should be noted that, in the variation, the processing module 43 may directly control the electronic device 40 to move to a region specified by the operational instruction, which is different from the variations described above in which the motion control instruction for controlling the electronic device 40 to move is obtained and transmitted by the host, received by the electronic device 40.

Optionally, the obtaining module 41 is also configured to obtain an image of an environment around the electronic device 40. The processing module 43 is also configured to determine the predetermined region based on the image obtained by the obtaining module 41. Practically, the processing module 43 may also use a predetermined region preserved in advance.

In another variation of the fourth embodiment of the disclosure, the information corresponding to the operational instruction includes a task execution instruction. The processing module 43 is also configured to execute the task execution instruction received by the obtaining module 41 to complete a task corresponding to the operational instruction.

For the working principle of the electronic device 40 according to the fourth embodiment of the disclosure and its variations, one may refer to the description of the aforementioned embodiments.

Figure 5A:
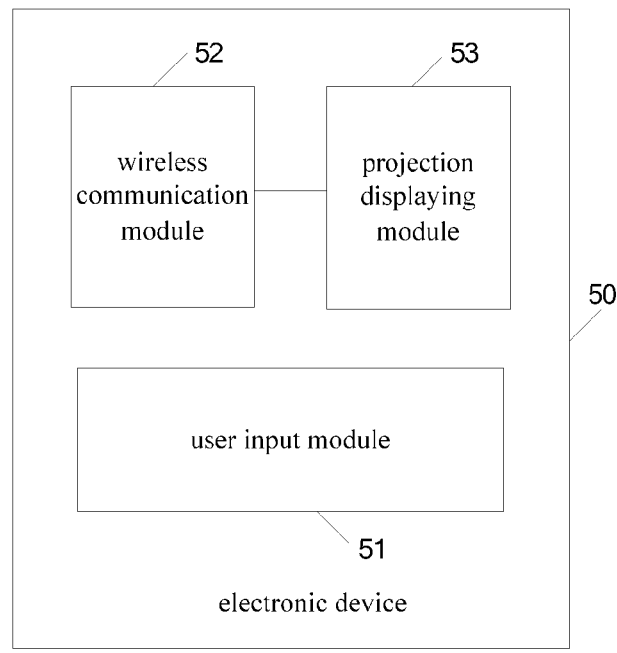
FIG. 5A to FIG. 5D are schematic structural diagrams of an electronic device according to a fourth embodiment of the disclosure and its variations.

FIG. 5A to FIG. 5D are schematic structural diagrams of an electronic device according to a fifth embodiment of the disclosure and its variations. In the fifth embodiment and its variations, the host may be the second electronic device in the fourth embodiment. As shown in FIG. 5A, an electronic device 50 according to the fifth embodiment of the disclosure includes a user input module 51, a wireless communication module 52 and a projection displaying module 53.

The user input module 51 is configured to receive an operational instruction from a user.

The wireless communication module 52 is configured to wirelessly transmit the operational instruction received by the user input module 51 to a host to make the host obtain information corresponding to the operational instruction.

The wireless communication module 52 is also configured to receive the information wirelessly transmitted from the host.

The projection displaying module 53 is configured to perform displaying via projection based on the information received by the wireless communication module 52.

The user input module 51 may include a voice input module. The electronic device 50 may also include a voice output module.

It may be seen that, compared with the conventional art in which the user holds a display screen in hand or disposes a display screen at a fixed position or with a fixed angle, resulting in that the user easily feels fatigue when the user watches the display screen, according to the electronic device provided by the embodiments of the disclosure, the electronic device performs displaying via projection with an optional angle and size, and the electronic device communicates with the host wirelessly and position of the electronic device is not "constrained" by the host, hence the electronic device may perform displaying via projection at any position in a flexible way, thereby improving comfort of using the desktop computer and improving a user experience.

As shown in FIG. 5A, in a variation of the fifth embodiment of the disclosure, the information corresponding to the operational instruction includes data information, and the projection displaying module 53 may further be configured to display the data information received by the wireless communication module 52 via projection.

Figure 5B:
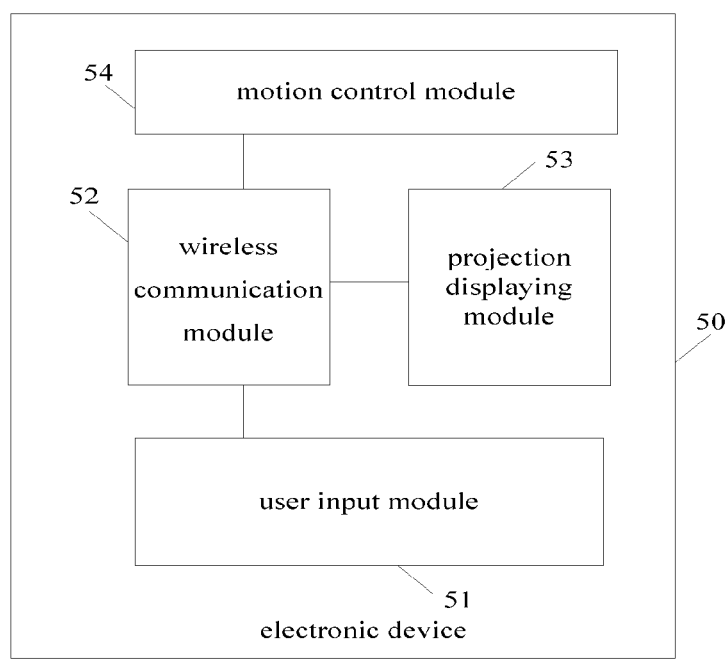

As shown in FIG. 5B, in another variation of the fifth embodiment of the disclosure, the information corresponding to the operational instruction includes a motion control instruction; the electronic device 50 also includes: a motion control module 54 configured to control the electronic device 50 to move to a position specified by the motion control instruction based on the motion control instruction received by the wireless communication module 52; and projection displaying module 53 configured to perform displaying via projection at the specified position.

Figure 5C:
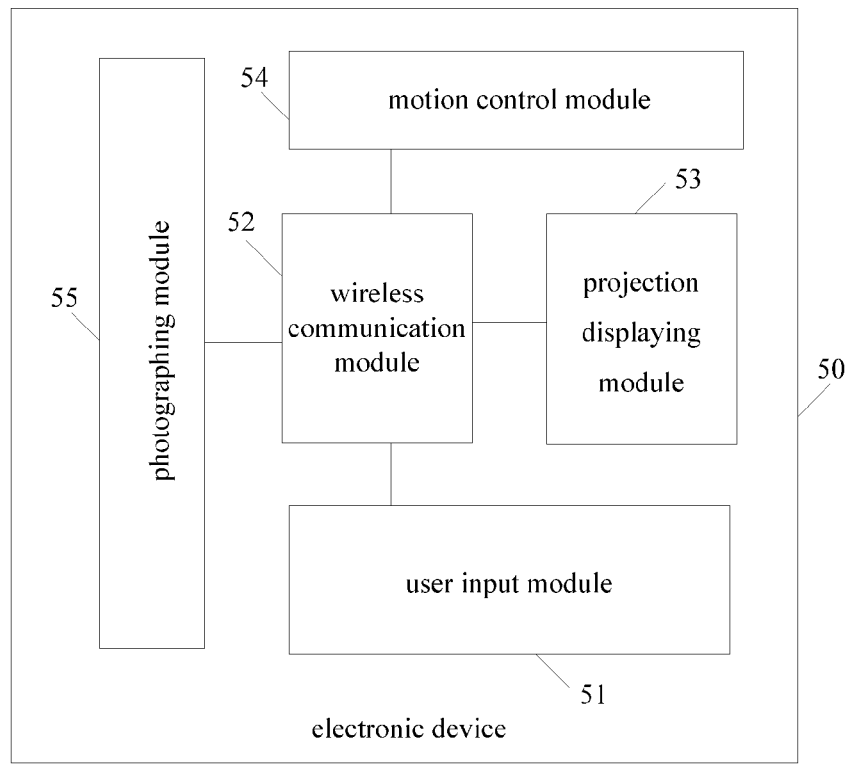

Optionally, as shown in FIG. 5C, the electronic device 50 also includes a photographing module 55 configured to obtain an image of an environment around the electronic device 50. The wireless communication module 52 is also configured to wirelessly transmit the image obtained by the photographing module 55 to the host to make the host determine a specified position based on the image. The photographing module 55 may include a three-dimensional camera (3D camera).

As show in FIG. 5C, in another variation of the fifth embodiment of the disclosure, the motion control module 54 is also configured to preprocess the operational instruction received by the user input module 51 to obtain a moving instruction, move to a position specified by the moving instruction, and generate light to display the data information at the position. In addition, the photographing module 55 is also configured to obtain an image of an environment around the electronic device 50. The motion control module 54 is also configured to determine the predetermined region based on the image obtained by the photographing module 55.

Figure 5D:
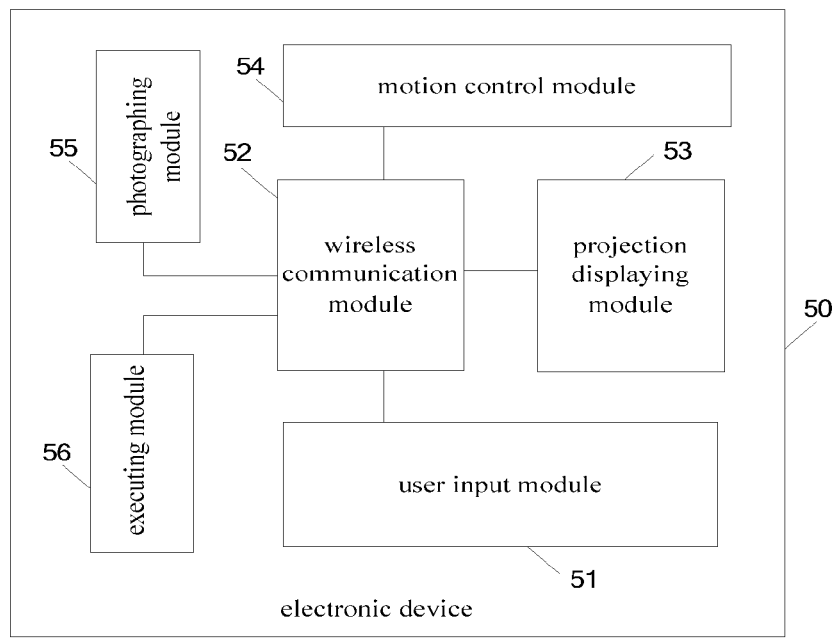

As shown in FIG. 5D, in another variation of the fifth embodiment of the disclosure, the information corresponding to the operational instruction includes a task execution instruction; the electronic device 50 also includes an executing module 56 configured to execute the task execution instruction received by the wireless communication module 52 to complete a task corresponding to the operational instruction. The electronic device 50 may include the motion control module 54, the photographing module 55 etc.

For the working principle of the electronic device 50 according to the fifth embodiment of the disclosure and its variations, one may refer to the description of the aforementioned embodiments.

Figure 6:
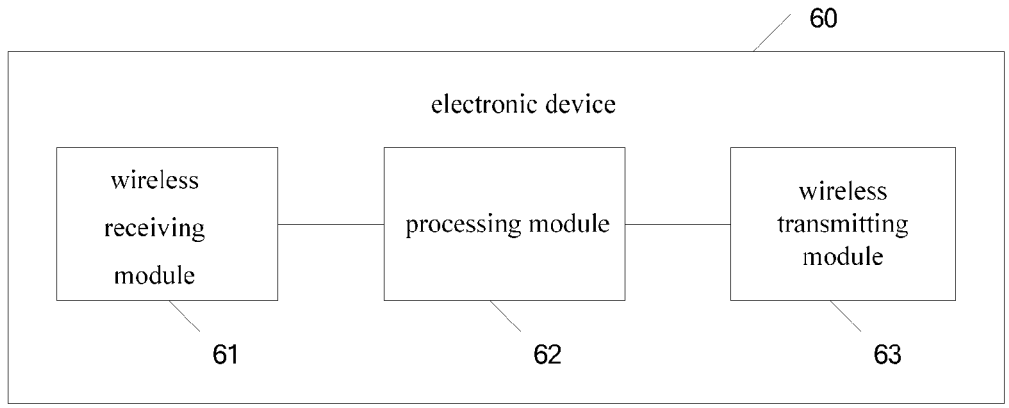
FIG. 6 is a schematic structural diagram of an electronic device according to a sixth embodiment of the disclosure.

As shown in FIG. 6, electronic device 60 according to a sixth embodiment of the disclosure includes: a wireless receiving module 61, a processing module 62 and a wireless transmitting module 63.

The wireless receiving module 61 is configured to receive an operational instruction transmitted from a first electronic device which is wirelessly coupled to the electronic device 60.

The processing module 62 is configured to process the operational instruction received by the wireless receiving module 61 to obtain information corresponding to the operational instruction.

The wireless transmitting module 63 is configured to transmit the information obtained by the processing module 62 to the first electronic device to make the first electronic device generate light to display in a predetermined region in response to the information.

It may be seen from above that, due to the support from the electronic device 60, the first electronic device performs displaying via projection with an optional angle and size, and the first electronic device communicates with the electronic device 60 wirelessly and the position of the first electronic device is not "constrained" by the electronic device 60, hence the first electronic device may perform displaying via projection at any position in a flexible way. Compared with the conventional art in which the user holds a display screen in hand or disposes a display screen at a fixed position or with a fixed angle, resulting in that the user easily feels fatigue when the user watches the display screen, the electronic device according to the embodiment of the disclosure may improve comfort of use for the user and improve the user experience.

In a variation of the sixth embodiment of the disclosure, the information corresponding to the operational instruction includes data information; and the wireless transmitting module 63 may also be configured to transmit the data information obtained by the processing module 62 to the first electronic device to make the first electronic device generate light to display the data information in the predetermined region.

In another variation of the sixth embodiment of the disclosure, the information includes a motion control instruction; and the wireless transmitting module 63 may also be configured to transmit the motion control instruction obtained by the processing module 62 to the first electronic device to make the first electronic device move to the predetermined region based on the received motion control instruction and generate light to display.

The wireless receiving module 61 is also configured to receive an image of an environment around the first electronic device transmitted from the first electronic device. The processing module 62 is also configured to determine the predetermined region based on the image received by the wireless receiving module 61.

In another variation of the sixth embodiment of the disclosure, the information corresponding to the operational instruction includes a task execution instruction; and the wireless transmitting module 63 is also configured to transmit the task execution instruction obtained by the processing module 62 to the first electronic device to make the first electronic device execute the task execution instruction to complete a task corresponding to the operational instruction.

For the working principle of the electronic device 60 according to the sixth embodiment of the disclosure and its variations, one may refer to the description of the aforementioned embodiments.

Figure 7:
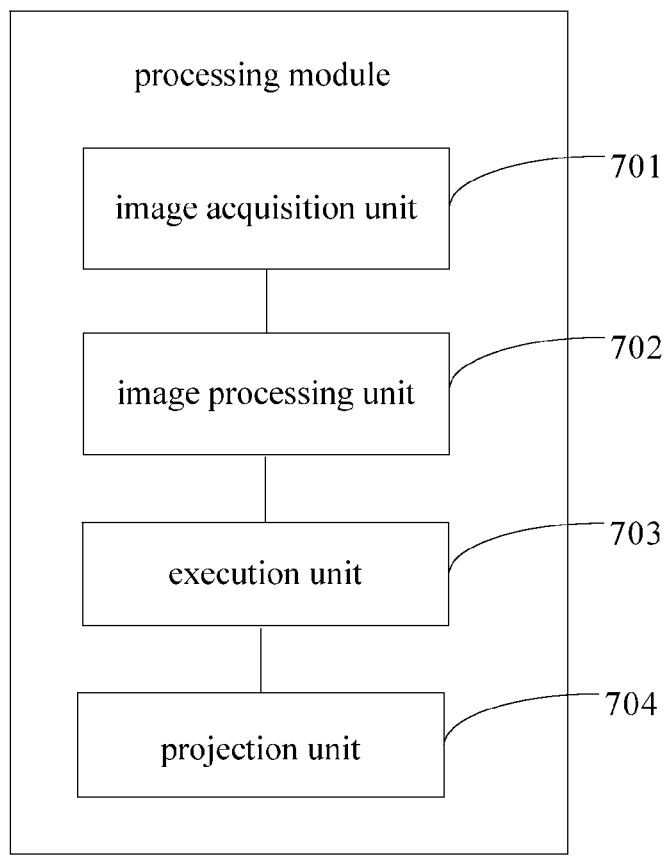
FIG. 7 is a schematic functional diagram of a processing module of the electronic device as shown in FIG. 4 according to an embodiment of the disclosure.

As shown in FIG. 7, in an embodiment of the disclosure, a processing module as shown in FIG. 4 includes: an image acquisition unit 701, an image processing unit 702, an execution unit 703 and a projection unit 704.

The image acquisition unit 701 is configured to acquire first image information periodically with a first time period and transmit the first image information to the image processing unit 702.

The first image information includes environmental information of the electronic device.

The image acquisition unit 701 is configured to acquire first image information periodically with a first time period and transmit the first image information acquired in each cycle to the image processing unit 702. The image acquisition unit may be a 3D camera capable of acquiring depth information such as Kinect and Xtion, and also may be an array camera consisting of a plurality of 2D cameras.

It should be noted that the first image information which is acquired by the image acquisition unit 701 periodically with the first time period only includes the environmental information before the projection unit 704 performs a projection. And the first image information which is acquired by the image acquisition unit 701 periodically with the first time period includes the environmental information, projection picture information and/or first sub-information after the projection unit 704 performs the projection.

The image processing unit 702 is configured to determine at least one imaging area in a current environment which meets a preset condition based on the first image information, generate a first control instruction and transmit the first control instruction to the execution unit 703.

Specifically, the image processing unit 702 extracts the environmental information of the electronic device and depth information at each point of the environment after the first image information transmitted by the image acquisition unit 701 is received. Alternatively, the the image processing unit may calculate the depth information at each point of the environment based on image information of multiple images included in the first image information, and thus determine an area capable of imaging, the position information and the size information of the area capable of imaging. Therefore, the image acquisition unit may generate the first control instruction based on the position information and the size information of the area capable of imaging. That is, the first control instruction carries the position information and the size information of the area capable of imaging and the first control instruction is transmitted to the execution unit 703.

The execution unit 703 is configured to adjust the positional relationship between the projection unit 704 and the at least one imaging area based on the first control instruction.

Specifically, the execution unit 103 resolves the first control instruction to obtain the position information and the size information of the area capable of imaging which are carried by the first control instruction after the first control instruction transmitted by the image processing unit 702 is received. Therefore, the positional relationship between the execution unit 703 and the area capable of imaging may be determined based on the position information and the size information of the area capable of imaging.

Figure 8:
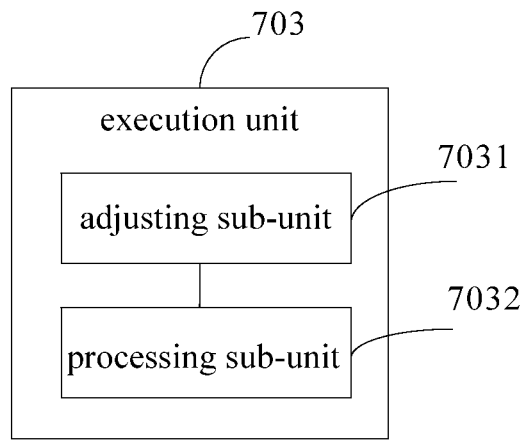
FIG. 8 is a schematic functional diagram of the electronic device showed in FIG. 7.

As shown in FIG. 8, the execution unit 703 further includes an adjusting sub-unit 7031.

The adjusting sub-unit 7031 is configured to adjust the positional relationship between the projection unit 704 and the at least one imaging area.

That is, the adjusting sub-unit 7031 is configured to adjust the positional relationship between the projection unit 704 and the at least one imaging area based on the first control instruction.

Specifically, the adjusting sub-unit 7031 resolves the first control instruction to obtain the position information and the size information of the area capable of imaging which are carried by the first control instruction after the first control instruction transmitted by the image processing unit 702 is received. Therefore the adjusting sub-unit 7031 determines a projection direction based on the position information and the size information of the area capable of imaging, and determines the positional relationship between the projection unit 704 and the area capable of imaging. In a case that a vertical distance between the position of the projection unit 704 and the position of the area capable of imaging is determined greater than a first distance, the adjusting sub-unit 7031 moves in a first direction to make the positional relationship between the projection unit 704 and area capable of imaging suitable for projecting. That is, the electronic device moves in the first direction to make the positional relationship between the electronic device and the area capable of imaging suitable for projecting. In a case that a vertical distance between the position of the projection unit 704 and the position of the area capable of imaging is determined less than a first distance, the adjusting sub-unit 7031 moves in a second direction to make the positional relationship between the projection unit 704 and the area capable of imaging suitable for projecting. That is, the electronic device moves in the second direction to make the positional relationship between the electronic device and the area capable of imaging suitable for projecting. The adjusting sub-unit 7031 adjusts an angle between the plane of a projection lens and the area capable of imaging after the positional relationship between the electronic device and the area capable of imaging is determined to make sure that the projection unit 704 may perform the projection completely on the desired area for projection during the projecting.

It should be noted that taking the area capable of imaging as a reference, the adjustment that the adjusting sub-unit 7031 moves in the first direction means that the adjusting sub-unit 7031 moves vertically towards the area capable of imaging; and the adjustment that the adjusting sub-unit 7031 moves in the second direction means that the adjusting sub-unit 7031 moves vertically away from the area capable of imaging.

It should be noted that the number of the area capable of imaging may be one or more than one, without being limited in the disclosure.

It should be noted that the adjusting sub-unit 7031 is further configured to transmit a projection instruction to the projection unit 704 after the positional relationship between the projection unit 704 and the at least one imaging area is determined based on the first control instruction to make the projection unit 704 perform the projection in the determined area capable of imaging based on the projection instruction.

It should be noted that the adjusting sub-unit 7031 may adjust the positional relationship between the projection unit 704 and the at least one imaging area by using other methods, without being limited in the disclosure.

Furthermore, the image processing unit 702 is further configured to determine whether the first image information includes projection picture information, determine whether there is a need to adjust a projection parameter if the first image information includes the projection picture, generate a second control instruction for adjusting the projection parameter and transmit the second control instruction to the projection unit 704 if there is a need to adjust the projection parameter.

The projection parameter includes focal distance information, and/or brightness information of the projection picture, and/or color information of the projection picture.

Specifically, the image processing unit 702 determines whether the first image information includes the projection picture information after the first image information transmitted by the image acquisition unit 701 is received. The image processing unit 102 extracts the projection picture information from the first image information if the first image information includes the projection picture information, and acquires sharpness information, color information and brightness information of each pixel of the projection picture information, and compares the acquired sharpness information, color information and brightness information of each pixel with sharpness information, color information and brightness information of each pixel of the original picture information which is transmitted to the electronic device by a terminal device.

Specifically, the image processing unit 702 compares the acquired sharpness information of each pixel of the projection picture information with the sharpness information of each pixel of the original picture information which is transmitted to the electronic device by the terminal device. In the case that the acquired sharpness information of each pixel of the projection picture information is determined different from the sharpness information of each pixel of the original picture information which is transmitted to the electronic device by the terminal device, the image processing unit 702 determines a sharpness correction value based on the sharpness information of each pixel of the original picture information and transmits the second control instruction which carries the sharpness correction value to the projection unit 704. Therefore the projection unit 704 may adjust the focal distance information of the projection picture based on the second control instruction which carries the sharpness correction value.

Specifically, the image processing unit 702 compares the acquired color information of each pixel of the projection picture information with the color information of each pixel of the original picture information which is transmitted to the electronic device by the terminal device. In the case that the acquired color information of each pixel of the projection picture information is determined different from the color information of each pixel of the original picture information which is transmitted to the electronic device by the terminal device, the image processing unit 702 determines a color correction value based on the color information of each pixel of the original picture information and transmits the second control instruction which carries the color correction value to the projection unit 704. Therefore the projection unit 704 may adjust the color information of the projection picture based on the second control instruction which carries the color correction value.

Specifically, the image processing unit 702 compares the acquired brightness information of each pixel of the projection picture information with the brightness information of each pixel of the original picture information which is transmitted to the electronic device by the terminal device. In the case that the acquired brightness information of each pixel of the projection picture information is determined different from the brightness information of each pixel of the original picture information which is transmitted to the electronic device by a terminal device, the image processing unit 702 determines a brightness correction value based on the brightness information of each pixel of the original picture information and transmits the second control instruction which carries the brightness correction value to the projection unit 704. Therefore the projection unit 704 may adjust the brightness information of the projection picture based on the second control instruction which carries the brightness correction value.

It should be noted that there is no requirement on the sequence in which the sharpness information, the color information and the brightness information of each pixel of the projection picture information are acquired by the image processing unit 702, without being limited in the disclosure.

It should be noted that the image processing unit 702 may determine an instruction for adjusting the focal distance information, and/or the brightness information of the projection picture, and/or the color information of the projection picture by using other methods, without being limited in the disclosure.

Furthermore, the image processing unit 702 is further configured to determine whether the first image information includes first sub-information which meets a preset condition, determine a third control instruction corresponding to the first sub-information and transmit the third control instruction to the execution unit 103 if the first image information includes the first sub-information which meets the preset condition.

It should be noted that the first sub-information may be gesture information. In this case, the image processing unit 102 may adjust the projection content or further adjust the distance between the projection unit 104 and the area capable of imaging, based on the gesture of the user. That is, the acquired gesture information includes projection content control information and/or projection parameter adjustment information. That is, the first sub-information includes the projection content control information and/or the projection parameter adjustment information.

Optionally, the projection content control information includes zooming information, page-turning information and marking information, and the projection parameter adjustment information includes distance adjustment information.

It should be noted that the specific gestures and the instructions for instructing the execution unit 703 to perform a corresponding operation may be stored in the image processing unit 702 in advance. There is a one-to-one correspondence between a specific gesture and an instruction for instructing the execution unit 703 to perform a corresponding operation. For example, a specific gesture of putting two hands together corresponds to an instruction for instructing the execution unit 703 to perform a zooming-out operation; a specific gesture of separating two hands corresponds to an instruction for instructing the execution unit 703 to perform a zooming-in operation; a specific gesture of waving to the left corresponds to an instruction for instructing the execution unit 703 to perform a page down operation; a specific gesture of waving to the right corresponds to an instruction for instructing the execution unit 703 to perform a page up operation; a specific gesture of waving down corresponds to an instruction for instructing the execution unit 703 to perform a marking operation; a specific gesture of separating five fingers corresponds to an instruction for instructing the execution unit 703 to move towards the area capable of imaging; a specific gesture of putting five fingers together corresponds to an instruction for instructing the execution unit 703 to move away from the area capable of imaging.

Specifically, in the case that the first sub-information includes the projection content control information, the image processing unit 702 being further configured to determine the third control instruction corresponding to the first sub-information includes:

the image processing unit 702 being configured to determine a projection content control sub-instruction corresponding to the projection content control information.

That is, in the case that the first sub-information includes the projection content control information, the image processing unit 702 determines the gesture represented by the first sub-information and determines whether the determined gesture matches with a specific gesture stored in advance. In the case that the acquired gesture matches with the specific gesture stored in advance, the image processing unit 702 determines the instruction for instructing the execution unit 703 to perform the operation based on the one-to-one correspondence between the specific gesture stored in advance and the instruction for instructing the execution unit 703 to perform the operation, and transmits the projection content control sub-instruction which carries the instruction for instructing the execution unit 703 to perform the operation to the execution unit 703.

For example, if the image processing unit 702 determines that the acquired gesture is a gesture of putting two hands together, the image processing unit 702 determines whether the gesture of putting two hands together matches with a specific gesture stored in advance. In the case that a gesture of putting two hands together is found among the specific gestures stored in advance, the image processing unit 702 determines that the acquired gesture of putting two hands together matches with the specific gesture of putting two hands together stored in advance, and thus the corresponding instruction for instructing the execution unit 703 to perform a zooming-out operation is founded. At this point, the image processing unit 702 transmits the projection content control sub-instruction which carries the instruction for instructing the execution unit 703 to perform the zooming-out operation to the execution unit 703.

If the image processing unit 702 determines that the acquired gesture is a gesture of waving to the left, the image processing unit 702 determines whether the gesture of waving to the left matches with a specific gesture stored in advance. In the case that the gesture of waving to the left is found among the specific gestures stored in advance, the image processing unit 702 determines that the acquired gesture of waving to the left matches with the specific gesture of waving to the left stored in advance, and thus the corresponding instruction for instructing the execution unit 703 to perform a page down operation is founded. At this point, the image processing unit 102 transmits the projection content control sub-instruction which carries the instruction for instructing the execution unit 703 to perform the page down operation to the execution unit 703.

If the image processing unit 702 determines that the acquired gesture is a gesture of waving down, the image processing unit 702 determines whether the gesture of waving down matches with a specific gesture stored in advance. In the case that the gesture of waving down is found among the specific gestures stored in advance, the image processing unit 702 determines that the acquired gesture of waving down matches with the specific gesture of waving down stored in advance, and thus the corresponding instruction for instructing the execution unit 703 to perform the marking operation is founded. At this point, the image processing unit 702 transmits the projection content control sub-instruction which carries the instruction for instructing the execution unit 703 to perform the marking operation to the execution unit 703.

In the case that the first sub-information includes the projection parameter adjustment information, the image processing unit 102 being further configured to determine the third control instruction corresponding to the first sub-information includes:

the image processing unit 702 being configured to determine a projection position control sub-instruction corresponding to the projection parameter adjustment information.

That is, in the case that the first sub-information includes the projection parameter adjustment information, the image processing unit 702 determines the gesture represented by the first sub-information and determines whether the determined gesture matches with a specific gesture stored in advance. In the case that the acquired gesture matches with the specific gesture stored in advance, the image processing unit 702 determines the instruction for instructing the execution unit 703 to perform the operation based on the one-to-one correspondence between the specific gesture stored in advance and the instruction for instructing the execution unit 703 to perform the operation, and transmits the projection position control sub-instruction which carries the instruction for instructing the execution unit 703 to perform the operation to the execution unit 703.

For example, if the image processing unit 702 determines that the acquired gesture is a gesture of separating five fingers, the image processing unit 702 determines whether the gesture of separating five fingers matches with a specific gesture stored in advance. In the case that the gesture of separating five fingers is found among the specific gestures stored in advance, the image processing unit 702 determines that the acquired gesture of separating five fingers matches with the specific gesture of separating five fingers stored in advance, and thus the corresponding instruction for instructing the execution unit 703 to move towards the area capable of imaging is founded. At this point, the image processing unit 702 transmits the projection position control sub-instruction which carries the instruction for instructing the execution unit 703 to move towards the area capable of imaging to the execution unit 703.

It should be noted that the image processing unit 702 may further determine an instruction for instructing the execution unit 703 to perform a zooming operation or a page-turning operation or a marking operation or a distance adjustment by using other methods, without being limited in the disclosure.

The execution unit 703 is further configured to execute the third control instruction.

Furthermore, as shown in FIG. 8, the execution unit 703 further includes a processing sub-unit 7032.

The processing sub-unit 7032 is configured to control a projection content.

Specifically, in the case that the first sub-information includes the projection content control information, the processing sub-unit 7032 being further configured to execute the third control instruction includes:

the processing sub-unit 7032 being configured to execute the projection content control sub-instruction.

That is, the processing sub-unit 7032 is configured to determine the information carried by the projection content control sub-instruction after the projection content control sub-instruction is received, and perform a corresponding operation on the projection content based on the carried information.

For example, in the case that the information carried by the projection content control sub-instruction is instruction information for performing the zooming-out operation, the processing sub-unit 7032 zooms out the projection picture based on the zooming out instruction information; in the case that the information carried by the projection content control sub-instruction is instruction information for performing the page down operation, the processing sub-unit 7032 turns the projection picture left based on the page down turning instruction information; and in the case that the information carried by the projection content control sub-instruction is instruction information for performing the marking operation, the processing sub-unit 7032 marks the projection picture based on the marking instruction information.

In the case that the first sub-information includes the projection parameter adjustment information, the adjusting sub-unit 7031 is further configured to execute the projection position control sub-instruction.

That is, the adjusting sub-unit 7031 is configured to determine the information carried by the projection position control sub-instruction after the projection position control sub-instruction is received, and perform the corresponding operation.

For example, in the case that the instruction carried by the projection position control sub-instruction is the instruction for moving towards the area capable of imaging, the adjusting sub-unit 7031 increase the projection distance based on the instruction for moving towards the area capable of imaging.

A processing sub-unit of an electronic device is provided in the disclosure. The processing sub-unit of the electronic device includes a projection unit, an image acquisition unit, an image processing unit and an execution unit. The image acquisition unit may acquire first image information periodically with a first time period and transmit the acquired first image information to the image processing unit. The image processing unit may determine an imaging area in the current environment which meets a preset condition based on the first image information, generate a first control instruction based on the determined imaging area and transmit the first control instruction to the execution unit. Thus the execution unit may adjust the positional relationship between the projection unit and the determined imaging area based on the received first control instruction. The electronic device may thus adjust a projection position automatically based on the acquired environmental information without an operation of the user, and thus the user experience is improved.

Figure 9:
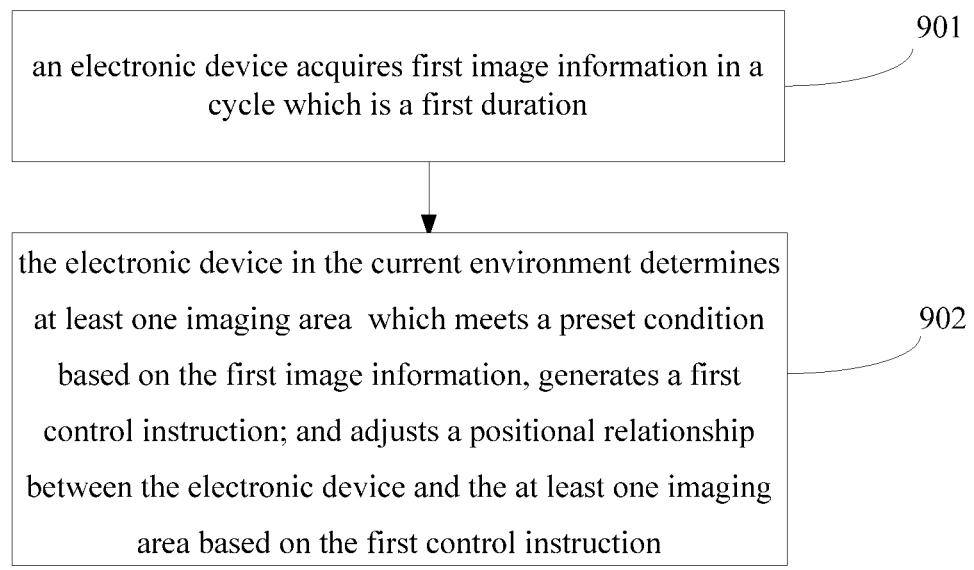
FIG. 9 is a schematic flowchart of a method for processing information according to an embodiment of the disclosure.

As shown in FIG. 9, in one embodiment of the present disclosure, the first electronic device generating light to display in a predetermined region in response to the information as disclosed in the first embodiment of the disclosure includes step 901 and step 902 as follows.

In step 901, first image information is acquired periodically with a first time period by the first electronic device.

Here, the information includes the first image information. The first image information includes environmental information of the first electronic device.

It should be noted that the first image information which is acquired periodically with the first time period only includes the environmental information in the case that the first electronic device does not perform a projection, and the first image information which is acquired periodically with the first time period includes the environmental information, projection picture information and/or first sub-information in the case that the first electronic device performs the projection.

In step 902, in a current environment at least one imaging area which meets a preset condition is determined based on the first image information and a first control instruction is generated by the first electronic device; and a positional relationship between the first electronic device and the at least one imaging area is adjusted based on the first control instruction by the first electronic device.

Specifically, the first electronic device extracts the environment information of the first electronic device included in the first image information after the first image information is received, acquires an area capable of imaging in the environment information of the first electronic device based on the preset condition, determines position information and size information of the area capable of imaging, and thus generates a first control instruction based on the position information and the size information of the area capable of imaging. Therefore the first electronic device determines a projection direction based on the position information and the size information of the area capable of imaging, and determines the positional relationship between the first electronic device and the area capable of imaging. In the case that a vertical distance between the position of the first electronic device and the position of the imaging area is greater than a first distance, the first electronic device moves in a first direction to make the positional relationship between the first electronic device and the area capable of imaging suitable for projecting. In the case a vertical distance between the position of the first electronic device and the position of the area capable of imaging is less than a first distance, the first electronic device moves in a second direction to make the positional relationship between the first electronic device and the area capable of imaging suitable for projecting. It is further to adjust an angle between the plane of a projection lens and the area capable of imaging after the positional relationship between the first electronic device and the area capable of imaging is determined to make sure that the first electronic device may completely project on a desired area for projection during the projecting.

It should be noted that taking the area capable of imaging as a reference, the adjustment that the first electronic device moves in the first direction indicates that the first electronic device moves vertically towards the area capable of imaging; and the adjustment that the first electronic device moves in the second direction indicates that the first electronic device moves vertically away from the area capable of imaging.

It should be noted that the first electronic device may further adjust the positional relationship between the first electronic device and the at least one imaging area using other methods, without being limited in the disclosure.

A method for processing information is provided in the disclosure. In the method for processing information, the step of the first electronic device generating light to display in a predetermined region in response to the information includes: acquiring, by the first electronic device, first image information periodically with a first time period; determining, by the first electronic device, an imaging area in a current environment which meets a preset condition based on the first image information and generating, by the first electronic device, a first control instruction; and thus adjusting, by the first electronic device, the positional relationship between the first electronic device and the imaging area based on the first control instruction. The first electronic device may thus adjust a projection position automatically based on the acquired environmental information without an operation of the user, and thus the user experience is improved.

Figure 10:
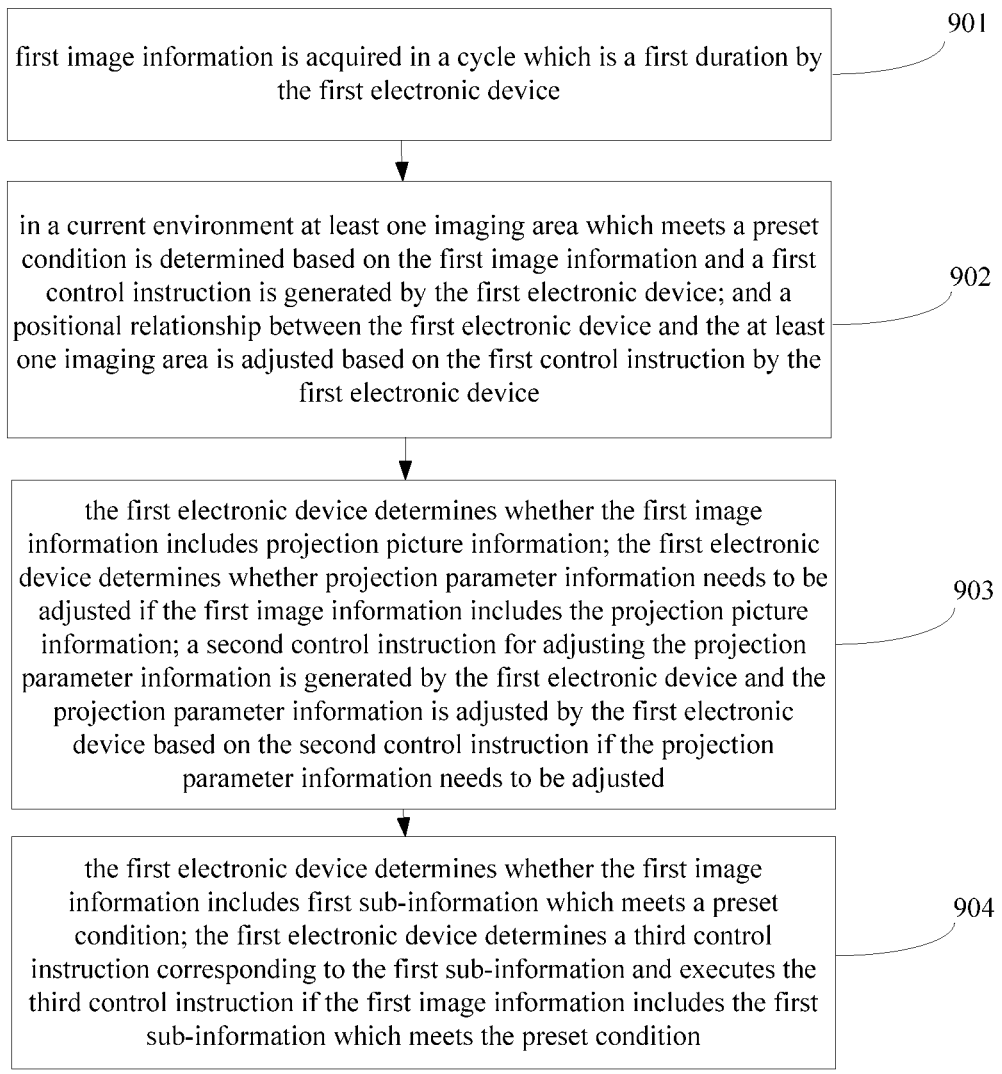
FIG. 10 is a schematic flowchart of a method for processing information according to an embodiment of the disclosure.

Furthermore, after step 902, as shown in FIG. 10, the method further includes steps 903 and 904 as follows.

In step 903, the first electronic device determines whether the first image information includes projection picture information; the first electronic device determines whether there is a need to adjust a projection parameter if the first image information includes the projection picture information; a second control instruction for adjusting the projection parameter is generated by the first electronic device and the projection parameter is adjusted by the first electronic device based on the second control instruction if there is a need to adjust the projection parameter.

The projection parameter includes focal distance information, and/or brightness information of the projection picture, and/or color information of the projection picture.

Specifically, the first electronic device determines whether the first image information includes the projection picture information after the first image information is received. In the case that the first image information includes the projection picture information, the first electronic device extracts the projection picture information from the first image information and acquires sharpness information, color information and brightness information of each pixel of the projection picture information, and compares the acquired sharpness information, color information and brightness information of each pixel of the projection picture information with sharpness information, color information and brightness information of each pixel of the original picture information which is transmitted to the first electronic device by a terminal device.

Specifically, the first electronic device compares the acquired sharpness information of each pixel of the projection picture information with the sharpness information of each pixel of the original picture information which is transmitted to the first electronic device by the terminal device. In the case that the acquired sharpness information of each pixel of the projection picture information is different from the sharpness information of each pixel of the original picture information which is transmitted to the first electronic device by the terminal device, the first electronic device determines a sharpness correction value based on the sharpness information of each pixel of the original picture information and generates the second instruction based on the sharpness correction value. Therefore the first electronic device may adjust the focal distance information of the projection picture based on the second instruction which carries the sharpness correction value.

Specifically, the first electronic device compares the acquired color information of each pixel of the projection picture information with the color information of each pixel of the original picture information which is transmitted to the first electronic device by the terminal device. In the case that the acquired color information of each pixel of the projection picture information is different from the color information of each pixel of the original picture information which is transmitted to the first electronic device by the terminal device, the first electronic device determines a color correction value based on the color information of each pixel of the original picture information and generates the second instruction based on the color correction value. Therefore the first electronic device may adjust the color information of the projection picture based on the second instruction which carries the color correction value.

Specifically, the first electronic device compares the acquired brightness information of each pixel of the projection picture information with the brightness information of each pixel of the original picture information which is transmitted to the first electronic device by the terminal device. In the case that the acquired brightness information of each pixel of the projection picture information is different from the brightness information of each pixel of the original picture information which is transmitted to the first electronic device by the terminal device, the first electronic device determines a brightness correction value based on the brightness information of each pixel of the original picture information and generates the second instruction based on the brightness correction value. Therefore the first electronic device may adjust the brightness information of the projection picture based on the second instruction which carries the brightness correction value.

It should be noted that there is no requirement on the sequence in which the sharpness information, the color information and the brightness information of each pixel of the projection picture information are acquired by the first electronic device, without being limited in the disclosure.

It should be noted that the first electronic device may further determine an instruction for adjusting the focal distance information, and/or the brightness information of the projection picture, and/or the color information of the projection picture by using other methods, without being limited in the disclosure.

In step 904, the first electronic device determines whether the first image information includes first sub-information which meets a preset condition; the first electronic device determines a third control instruction corresponding to the first sub-information and executes the third control instruction if the first image information includes the first sub-information which meets the preset condition.

It should be noted that the first sub-information may be gesture information. In this case, the first electronic device may adjust the projection content or further adjust the distance between the first electronic device and the area capable of imaging based on the gesture of the user. That is, the acquired gesture information includes projection content control information and/or projection parameter adjustment information. That is, the first sub-information includes the projection content control information and/or the projection parameter adjustment information.

Optionally, the projection content control information includes zooming information, page-turning information and marking information, and the projection parameter adjustment information includes distance adjustment information.

It should be noted that specific gestures and instructions for instructing the first electronic device to perform a corresponding operation may be stored in the first electronic device in advance. There is a one-to-one correspondence between a specific gesture and an instruction for instructing the first electronic device to perform a corresponding operation. For example, a specific gesture of putting two hands together corresponds to an instruction for instructing the first electronic device to perform a zooming-out operation; a specific gesture of separating two hands corresponds to an instruction for instructing the first electronic device to perform a zooming-in operation; a specific gesture of waving to the left corresponds to an instruction for instructing the first electronic device to perform a page down operation; a specific gesture of waving to the right corresponds to an instruction for instructing the first electronic device to perform a page up operation; a specific gesture of waving down corresponds to an instruction for instructing the first electronic device to perform a marking operation; a specific gesture of separating five fingers corresponds to an instruction for instructing the first electronic device to move towards the area capable of imaging; a specific gesture of putting five fingers together corresponds to an instruction for instructing the first electronic device to move away from the first electronic device.

Specifically, in the case that the first sub-information includes the projection content control information, the first electronic device determines the projection content control sub-instruction corresponding to the projection content control information.

That is, in the case that the first sub-information includes the projection content control information, the first electronic device determines the gesture represented by the first sub-information and determines whether the determined gesture matches with a specific gesture stored in advance. In the case that the acquired gesture matches with a specific gesture stored in advance, the first electronic device determines the instruction for instructing the first electronic device to perform the operation based on the corresponding relationship between the specific gesture stored in advance and the instruction for instructing the first electronic device to perform the operation, and generates the projection content control sub-instruction based on the instruction for instructing the first electronic device to perform the operation, and thus the first electronic device performs corresponding operation based on the projection content control sub-instruction.

In the case that the first sub-information includes the projection parameter adjustment information, the first electronic device determines a projection position control sub-instruction corresponding to the projection parameter adjustment information.

That is, in the case that the first sub-information includes the projection parameter adjustment information, the first electronic device determines the gesture represented by the first sub-information and determines whether the determined gesture matches with a specific gesture stored in advance. In the case that the acquired gesture matches with a specific gesture stored in advance, the first electronic device determines the instruction for instructing the first electronic device to perform the operation based on the corresponding relationship between the specific gesture stored in advance and the instruction for instructing the first electronic device to perform the operation, and generates the projection position control sub-instruction based on the instruction for instructing the first electronic device to perform the operation, and thus the first electronic device performs corresponding operation based on the projection position control sub-instruction.

It should be noted that the first electronic device may further performs a zooming operation or a page-turning operation or a marking operation or a distance adjustment on the projection content by using other methods, without being limited in the disclosure.

It should be noted that there is no requirement on the sequence in which step 903 and step 904 are performed, without being limited in the disclosure.

A method for processing information, includes:

receiving an operational instruction associated with a first electronic device;

transmitting the received operational instruction to a second electronic device which is wirelessly coupled to the first electronic device;

receiving information corresponding to the operational instruction, where the information is processed by the second electronic device; and generating, by the first electronic device in response to the information, light to display in a predetermined region.

The information includes data information; and generating, by the first electronic device in response to the information, light to display in a predetermined region includes:

generating, by the first electronic device, light to display the data information in the predetermined region.

The information includes a motion control instruction; and generating, by the first electronic device in response to the information, light to display in a predetermined region includes:

moving to the predetermined region based on the motion control instruction and generating, by the first electronic device, light to display.

Before the receiving information corresponding to the operational instruction, where the information is processed by the second electronic device, the method further includes:

obtaining, by the first electronic device, an image of an environment around the first electronic device and transmitting the obtained image to the second electronic device to make the second electronic device determine the predetermined region based on the image.

After receiving the operational instruction, the method further includes:
preprocessing the operational instruction to obtain a moving instruction; and
moving to the predetermined region corresponding to the moving instruction and generating light to display the data information in the predetermined region.

Before the preprocessing the operational instruction to obtain a moving instruction, the method further includes:
obtaining, by the first electronic device, an image of an environment around the first electronic device and determining the predetermined region based on the image.

The information includes a task execution instruction; and
after receiving information corresponding to the operational instruction, where the information is processed by the second electronic device, the method further includes:
executing the task execution instruction to complete a task corresponding to the operational instruction.

A method for processing information, includes:
receiving an operational instruction associated with a first electronic device transmitted from the first electronic device which is wirelessly coupled to the second electronic device;
processing the operational instruction to obtain information corresponding to the operational instruction; and
transmitting the information to the first electronic device to make the first electronic device generate light to display in a predetermined region in response to the information.

The information includes data information; and
transmitting the information to the first electronic device to make the first electronic device generate light to display in a predetermined region in response to the information includes:
transmitting the data information to the first electronic device to make the first electronic device generate light to display the data information in the predetermined region.

The information includes a motion control instruction; and
transmitting the information to the first electronic device to make the first electronic device generate light to display in a predetermined region in response to the information includes:
transmitting the motion control instruction to the first electronic device to make the first electronic device move to the predetermined region based on the motion control instruction and generates light to display.

Before processing the operational instruction to obtain information corresponding to the operational instruction, the method further includes:
receiving an image of an environment around the first electronic device transmitted from the first electronic device, and determining the predetermined region based on the image.

The information includes a task execution instruction; and
after processing the operational instruction to obtain information corresponding to the operational instruction, the method further includes:
transmitting the task execution instruction to the first electronic device to make the first electronic device execute the task execution instruction to complete a task corresponding to the operational instruction.

An electronic device, includes:
an obtaining module configured to receive an operational instruction;
a wireless transmitting module configured to transmit the operational instruction received by the obtaining module to a second electronic device which is wirelessly coupled to the electronic device;
where the obtaining module is further configured to receive information corresponding to the operational instruction, where the information is processed by the second electronic device; and
a processing module configured to generate light to display in a predetermined region in response to the information received by the obtaining module.

The information includes data information; and
the processing module is configured to generate light to display the data information received by the obtaining module in the predetermined region.

The information includes a motion control instruction; and
the processing module is configured to execute the motion control instruction received by the obtaining module to make the electronic device move to the predetermined region and perform projection displaying.

The obtaining module is further configure to obtain an image of an environment around the electronic device; and
the wireless transmitting module is further configured to transmit the image obtained by the obtaining module to the second electronic device to make the second electronic device determine the predetermined region based on the image.

The processing module is further configured to:
preprocess the operational instruction received by the obtaining module to obtain a moving instruction; and
execute the moving instruction to drive the electronic device to move to the predetermined region and generate light to display the data information in the predetermined region.

The obtaining module is further configured to obtain an image of an environment around the electronic device; and
the processing module is further configured to determine the predetermined region based on the image obtained by the obtaining module.

The information includes a task execution instruction; and
the processing module is further configured to execute the task execution instruction received by the obtaining module to complete a task corresponding to the operational instruction.

An electronic device, includes:
a wireless receiving module configured to receive an operational instruction transmitted from a first electronic device which is wirelessly coupled to the electronic device;
a processing module configured to process the operational instruction received by the wireless receiving module to obtain information corresponding to the operational instruction; and
a wireless transmitting module configured to transmit the information obtained by the processing module to the first electronic device to make the first electronic device generate light to display in a predetermined region in response to the information.

The information includes data information; and
the wireless transmitting module is configured to transmit the data information obtained by the processing module to the first electronic device to make the first electronic device generate light to display the data information in the predetermined region.

The information includes a motion control instruction; and the wireless transmitting module is configured to transmit the motion control instruction obtained by the processing module to the first electronic device to make the first electronic device move to the predetermined region based on the received motion control instruction and generate light to display.

The wireless receiving module is further configured to receive an image of an environment around the first electronic device transmitted from the first electronic device; and the processing module is further configured to determine the predetermined region based on the image received by the wireless receiving module.

The information includes a task execution instruction; and the wireless transmitting module is further configured to transmit the task execution instruction obtained by the processing module to the first electronic device to make the first electronic device execute the task execution instruction to complete a task corresponding to the operational instruction.

An electronic device, includes:

a projection unit; an image acquisition unit; an image processing unit; and an execution unit, where the image acquisition unit is configured to acquire first image information periodically with the first time period and transmit the first image information to the image processing unit, where the first image information includes environmental information of the electronic device;

the image processing unit is configured to determine in a current environment at least one imaging area which meets a preset condition based on the first image information, generate a first control instruction, and transmit the first control instruction to the execution unit; and the execution unit is configured to adjust a positional relationship between the projection unit and the at least one imaging area based on the first control instruction.

In a current environment, determining at least one imaging area which meets a preset condition based on the first image information includes:

determining according to the environmental information of the first image information, depth information for each point within a range of the environment from which the each point is selected, and determining, according to the depth information the at least one imaging area and position information of the at least one imaging area in the current environment.

The image processing unit is further configured to determine whether the first image information includes projection picture information, determine whether there is a need to adjust a projection parameter if the first image information includes the projection picture information, generate a second control instruction for adjusting the projection parameter and transmit the second control instruction to the projection unit if there is a need to adjust the projection parameter.

The image processing unit is further configured to determine whether the first image information includes first sub-information which meets a preset condition, determine a third control instruction corresponding to the first sub-information and transmit the third control instruction to the execution unit if the first image information includes the first sub-information which meets the preset condition; and the execution unit is further configured to execute the third control instruction.

The first sub-information includes projection content control information and/or projection parameter adjustment information, where in the case that the first sub-information includes the projection content control information, the image processing unit being further configured to determine the third control instruction corresponding to the first sub-information includes the image processing unit being configured to determine a projection content control sub-instruction corresponding to the projection content control information; and in the case that the first sub-information includes the projection parameter adjustment information, the image processing unit being further configured to determine the third control instruction corresponding to the first sub-information includes the image processing unit being configured to determine a projection position control sub-instruction corresponding to the projection parameter adjustment information.

The projection content control information includes zooming information, page-turning information and marking information; and the projection parameter adjustment information includes distance adjustment information.

The execution unit includes an adjusting module and a processing module, where the adjusting module is configured to adjust the positional relationship between the projection unit and the at least one imaging area, and the processing module is configured to control a projection content.

The execution unit being configured to adjust the positional relationship between the projection unit and the at least one imaging area based on the first control instruction includes the adjusting module being configured to adjust the positional relationship between the projection unit and the at least one imaging area based on the first control instruction;

in the case that the first sub-information includes the projection content control information, the execution unit being further configured to execute the third control instruction includes the processing module being configured to execute the projection content control sub-instruction; and in the case that the first sub-information includes the projection parameter adjustment information, the execution unit being further configured to execute the third control instruction includes a adjusting module being configured to execute the projection position control sub-instruction.

A projection method, including:

acquiring, by a first electronic device, first image information periodically with the first time period, where the first image information includes environmental information of the first electronic device;

determining, by the first electronic device in a current environment, at least one imaging area which meets a preset condition based on the first image information and generating a first control instruction; and adjusting, by the first electronic device, a positional relationship between the first electronic device and the at least one imaging area based on the first control instruction.

Determining, by the first electronic device in the current environment, the at least one imaging area which meets the preset condition based on the first image information includes:

Determining, according to the environmental information of the first image information, depth information at each point within a range of the environment from which the each point is selected, and determining, according to the depth information, the at least one imaging area and position information of the at least one imaging area in the current environment.

After acquiring the first image information by the first electronic device periodically with the first time period, the method further includes:

determining whether the first image information includes projection picture information, determining whether there is a need to adjust a projection parameter in the case that the first image information includes the projection picture information, generating a second control instruction for adjusting the projection parameter and adjusting the projection parameter based on the second control instruction, by the first electronic device, in the case that there is a need to adjust the projection parameter.

After adjusting the positional relationship between the first electronic device and the at least one imaging area by the first electronic device based on the first control instruction:

determining whether the first image information includes first sub-information which meets the preset condition, determining a third control instruction corresponding to the first sub-information and executing the third control instruction, by the first electronic device, in the case that the first image information includes the first sub-information which meets the preset condition.

The first sub-information includes projection content control information and/or projection parameter adjustment information, where in the case that the first sub-information includes the projection content control information, determining the third control instruction corresponding to the first sub-information by the first electronic device includes determining a projection content control sub-instruction corresponding to the projection content control information by the first electronic device; and in the case that the first sub-information includes the projection parameter adjustment information, determining the third control instruction corresponding to the first sub-information by the first electronic device includes determining a projection position control sub-instruction corresponding to the projection parameter adjustment information by the first electronic device.

The projection content control information includes zooming information, page-turning information and marking information; and the projection parameter adjustment information includes distance adjustment information.

According to the method for processing information and the electronic device provided by the disclosure, the first electronic device receives an operational instruction from a user, and transmits the received operational instruction to the second electronic device wirelessly connected with the first electronic device; the second electronic device receives and processes the operational instruction to obtain information corresponding to the operational instruction, and transmits the information to the first electronic device; and the first electronic device generates light to display in a predetermined region in response to the information. The first electronic device performs projection displaying with an optional angle and size, and the first electronic device communicates with the second electronic device wirelessly, the position of the first electronic device is not "constrained" by the second electronic device which is more cumbersome in relation to the first electronic device, hence the first electronic device may perform displaying via projection at any position in a flexible way. Compared with the conventional art in which the user holds a display screen in hand or disposes a display screen at a fixed position or with a fixed angle, resulting in that the user easily feels fatigue when watching the display screen, the method for processing information and the electronic device provided in the embodiments of the invention can improve comfort during watching by using the electronic device for the user and improve a user experience.

Further, the processing module of the electronic device includes a projection unit, an image acquisition unit, an image processing unit and an execution unit. The image acquisition unit may be configured to acquire first image information periodically with the first time period and transmit the acquired first image information to the image processing unit. The image processing unit may be configured to determine in a current environment an imaging area which meets a preset condition based on the first image information, generate a first control instruction based on the determined imaging area and transmit the first control instruction to the execution unit. Thus the execution unit may be configured to adjust a positional relationship between the projection unit and the determined imaging area based on the received first control instruction. The electronic device thus may adjust a projection position automatically based on the acquired environmental information without an operation of the user, and thus the user experience is improved.

Various embodiments in the specification have been described with certain emphasis. For the same or similar parts between various embodiments, one may refer to the description of other embodiments, and each embodiment lays emphasis on the difference from other embodiments. Particularly, for the apparatus embodiment, since it is substantially similar to the method embodiment, it is described simply, and for the relative parts one may refer to the illustration of the corresponding parts of the method embodiment.

It should be noted that, the apparatus embodiments described above are only illustrative. The unit illustrated as the separate component may be physically separated or not. The components displayed as the unit may be a physical unit or not, i.e., the components may be located at one position or may be distributed on multiple network units. Some or all of the modules may be selected based on the actual need to achieve the objects of the solutions of the embodiments. In addition, in the accompanying drawings of the apparatus embodiments provided by the disclosure, the connection between the modules may include a communication connection, which may be implemented by one or more communication bus or signal line. Those skilled in the art may understand and implement the disclosure without any creative work.

Those skilled in the art should understand that, various aspects of the disclosure or the possible implementing ways thereof may be implemented as a system, a method or a computer program product. Hence, various aspects of the disclosure or the possible implementing ways thereof may adopt an only hard embodiment, an only software embodiment (including a firmware, a resident software etc.) or a combination embodiment of a software embodiment and a hard embodiment, which are collectively referred to as "a circuit', "a module" or "a system" here. In addition, various aspects of the disclosure or the possible implementing ways thereof may adopt a computer program product, which refers to a computer readable program code stored in the computer readable media.

The computer readable medium may be a computer readable signal medium or a computer readable storage medium. The computer readable storage medium includes but not limits to an electronic, a magnetic, an optical, an electromagnetic, an infrared or a semiconductor system, device or apparatus, or any suitable combination thereof, for example a Random Access Memory (RAM), a Read Only Memory (ROM), an Erasable Programmable Read Only Memory (EPROM or a flash memory), an optical fiber or a portable ROM (CD-ROM).

The processor in the computer reads the computer readable program code from the computer readable medium, such that the processor can perform the functional actions specified in each step of the flow charts or a combination of each step, and generate an apparatus for implementing the functional actions specified in each block of the block diagrams or a combination of each block.

The computer readable program code may be executed by the following ways: completely executed on the computer of the user, partly executed on the computer of the user, partly executed on the computer of the user and partly executed on the remote computer as an independent software package, or completely executed on the remote computer or the server as an independent software package. It should also be noted that, in some alternative implementing solutions, the functions specified in each step of the flow charts or in each block of the block diagrams may not be executed in accordance with the order specified in the diagram. For example, based on the related function, in practice, two steps or two blocks shown in succession may be performed substantially simultaneously or these blocks may be performed in an opposite order.

The above described are only the specific embodiments of the disclosure, but the scope of protection of the disclosure is not limited thereto. Any changes or substitutions which may be easily conceived by those skilled in the art within the technical scope disclosed by the disclosure fall within the scope of protection of the disclosure. Hence, the scope of protection of the disclosure should be based on the scope of protection of the claims.

The invention claimed is:

1. A method for processing information, comprising:
   receiving, by a first electronic device, an operational instruction associated with the first electronic device transmitted from another device;
   directly transmitting, by the first electronic device, the received operational instruction to a second electronic device which is wirelessly coupled to the first electronic device;
   directly receiving, by the first electronic device, information transmitted from the second electronic device, wherein the information corresponds to the operational instruction and includes data information and a motion control instruction; and
   moving, by the first electronic device, to a predetermined region based on the motion control instruction included in the information transmitted from the second electronic device, and generating, by the first electronic device, light to display the data information included in the information transmitted from the second electronic device in the predetermined region.

2. The method according to claim 1, wherein before receiving the information from the second electronic device, the method further comprises:
   obtaining, by the first electronic device, an image of an environment around the first electronic device, and transmitting the obtained image to the second electronic device to determine the predetermined region based on the image.

3. The method according to claim 1, wherein after receiving the operational instruction, the method further comprises:
   preprocessing the operational instruction to obtain a moving instruction;
   moving to the predetermined region corresponding to the moving instruction; and
   generating light to display the data information in the predetermined region.

4. The method according to claim 1, wherein the information further comprises first image information; and said generating comprises:
   acquiring the first image information periodically with a first time period, wherein the first image information comprises environmental information of the first electronic device;
   determining at least one imaging area which meets a preset condition based on the first image information;
   generating a first control instruction; and
   adjusting a positional relationship between the first electronic device and the at least one imaging area based on the first control instruction.

5. The method according to claim 4, wherein said determining the at least one imaging area comprises:
   determining, according to the environmental information of the first image information, depth information for each point within a range of the environment from which the each point is selected; and
   determining, according to the depth information, the at least one imaging area and position information of the at least one imaging area in the current environment.

6. The method according to claim 4, wherein after acquiring the first image information in the first time period, the method further comprises:
   determining, by the first electronic device, whether the first image information comprises a projection picture information;
   determining whether there is a need to adjust a projection parameter if the first image information comprises the projection picture information;
   generating a second control instruction for adjusting the projection parameter if there is a need to adjust the projection parameter; and
   adjusting the projection parameter based on the second control instruction.

7. The method according to claim 4, wherein after adjusting the positional relationship between the first electronic device and the at least one imaging area, the method further comprises:
   determining, by the first electronic device, whether the first image information comprises first sub-information which meets a preset condition; and
   determining a third control instruction corresponding to the first sub-information and executing the third control instruction if the first image information comprises the first sub-information which meets the preset condition.

8. The method according to claim 7, wherein said determining the third control instruction comprises:
   determining a projection content control sub-instruction corresponding to projection content control information, in the case that the first sub-information comprises the projection content control information; and
   determining a projection position control sub-instruction corresponding to projection parameter adjustment information, in the case that the first sub-information comprises the projection parameter adjustment information.

9. An electronic device, comprising:
a processor coupled to a memory which stores executable instruction codes, wherein the instruction codes when executed by the processor, cause the electronic device to:
receive an operational instruction from another device;
directly transmit the operational instruction to a second electronic device wirelessly coupled to the electronic device;
directly receive information transmitted from the second electronic device, and the information corresponds to the operational instruction and includes data information and a motion control instruction; and
move to a predetermined region based on the motion control instruction included in the information transmitted from the second electronic device, and generate light to display the data information included in the information transmitted from the second electronic device in the predetermined region.

10. The electronic device according to claim 9, wherein the instruction codes when executed by the processor, further cause the electronic device to obtain an image of an environment around the electronic device; and
transmit the image to the second electronic to determine the predetermined region based on the image.

11. The electronic device according to claim 9, wherein the instruction codes when executed by the processor, further cause the electronic device to:
preprocess the operational instruction received to obtain a moving instruction;
execute the moving instruction to move the electronic device to the predetermined region; and
generate light to display the data information in the predetermined region.

12. The electronic device according to claim 9, wherein the information further comprises first image information;
the electronic device further comprises a projection unit;
the instruction codes when executed by the processor, further cause the electronic device to:
acquire the first image information periodically with a first time period, wherein the first image information comprises environmental information of the electronic device;
determine at least one imaging area which meets a preset condition based on the first image information, and generates a first control instruction; and
adjust a positional relationship between the projection unit and the at least one imaging area based on the first control instruction.

13. The electronic device according to claim 12, wherein the instruction codes when executed by the processor, further cause the electronic device to:
determine, according to the environmental information of the first image information, depth information for each point within a range of the environment from which the each point is selected; and
determine, according to the depth information, the at least one imaging area and position information of the at least one imaging area in the environment.

14. The electronic device according to claim 12, wherein the instruction codes when executed by the processor, further cause the electronic device to:
determine whether the first image information comprises projection picture information;
determine whether there is a need to adjust a projection parameter if the first image information comprises the projection picture information;
generate a second control instruction for adjusting the projection parameter if there is a need to adjust the projection parameter; and
transmit the second control instruction to the projection unit.

15. The electronic device according to claim 12, wherein the instruction codes when executed by the processor, further cause the electronic device to:
determine whether the first image information comprises first sub-information which meets a preset condition;
determine a third control instruction corresponding to the first sub-information, if the first image information comprises the first sub-information which meets the preset condition; and
execute the third control instruction.

16. The electronic device according to claim 15, wherein the first sub-information comprises projection content control information and/or projection parameter adjustment information; and the instruction codes when executed by the processor, further cause the electronic device to:
determine a projection content control sub-instruction corresponding to the projection content control information, in the case that the first sub-information comprises the projection content control information; and
determine a projection position control sub-instruction corresponding to the projection parameter adjustment information, in the case that the first sub-information comprises the projection parameter adjustment information.

* * * * *